Feb. 19, 1952     H. R. REYNOLDS ET AL     2,586,087
METHOD OF APPLYING A SEAL TO A RADIAL GROOVE
Filed Dec. 1, 1945
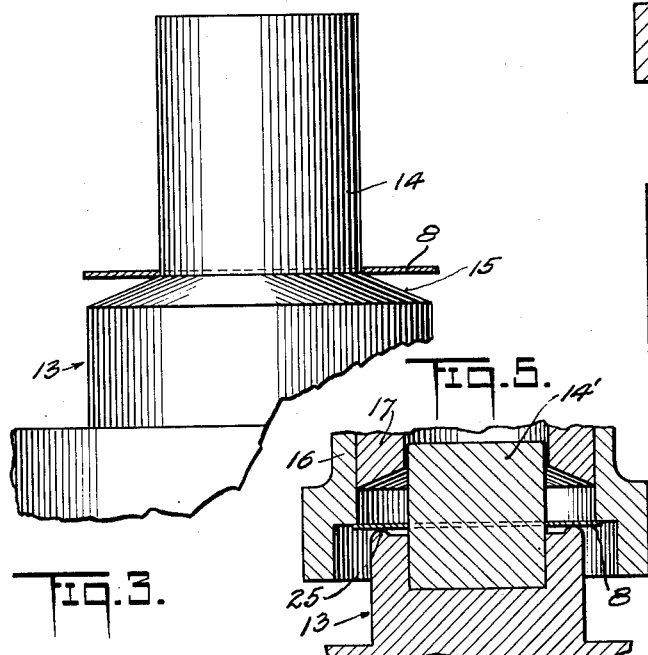
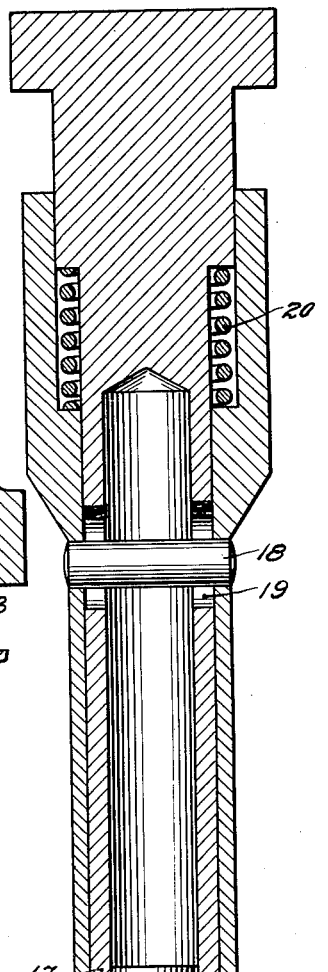
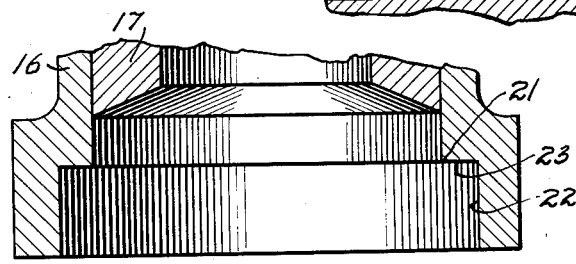
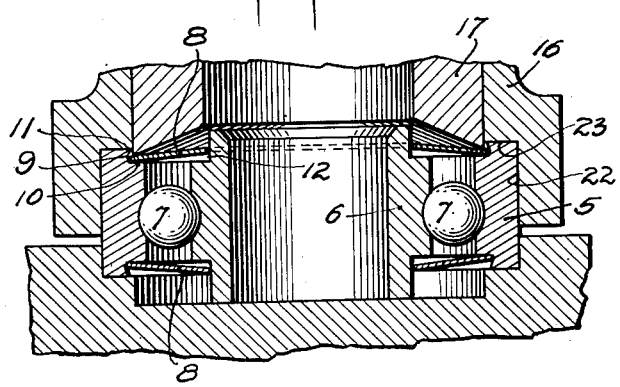
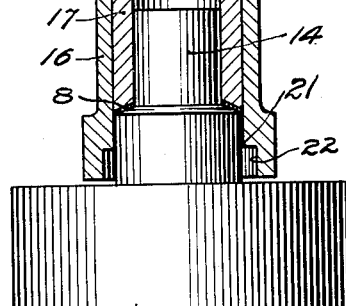
INVENTOR
Harry R. Reynolds
Clarence C. Bidwell
BY
ATTORNEYS.

Patented Feb. 19, 1952

2,586,087

UNITED STATES PATENT OFFICE 2,586,087

METHOD OF APPLYING A SEAL TO A RADIAL GROOVE

Harry R. Reynolds and Clarence G. Bidwell, New Britain, Conn., assignors to The Fafnir Bearing Company, New Britain, Conn., a corporation of Connecticut Application December 1, 1945, Serial No. 632,246

1 Claim. (Cl. 29—148)

Our invention relates to a method of applying a seal to a bearing.

Plate and the like seals have been applied to bearings by swaging the same into grooves or by holding the same by means of snap rings or other devices.

Our invention has to do particularly with a plate or similar seal which is stressed within its elastic limit and is held in an undercut groove by the inherent resiliency of the material of which the seal is made. The seal may be formed of any suitable spring material including thin sheet steel or other metal or may be formed of spring-like plastics of considerable hardness and springiness so as to be somewhat steel-like in action. The finished seal is preferably a disk-like member held in the undercut groove by the inherent resiliency of the material of which the seal is made and the latter may be confined to more or less flat conical shape or may be perfectly flat or plane. Our invention avoids the disadvantages of swaging a seal and in fact permits the use of seal material which cannot be satisfactorily swaged.

The preferred method of applying the seal is first to spring the seal disk or plate into generally conical form so as to decrease the outer diameter to about the diameter of the entrance to the groove in the bearing ring. While the plate is thus confined to a reduced diameter it is applied to the entrance to the groove and released so that it will spring out into the groove and, depending upon the diameter of the groove, it will assume a flat disk-like shape or a slightly conical shape. The seal will be held in place by the inherent resiliency of the seal material.

It is an object of the invention, therefore, to provide an improved bearing seal.

It is another object to provide an improved method of applying a seal of spring material to a bearing.

Another object is to provide improved apparatus for applying a seal of spring material to a bearing ring.

Other objects and various features of novelty and invention will be hereinafter pointed out or will become apparent to those skilled in the art.

In the drawings which show, for illustrative purposes, a preferred form of bearing and preferred form of apparatus for applying a bearing seal;

Fig. 1 is a fragmentary view in side elevation of a pilot block showing a seal disk in place thereon;

Fig. 2 is a view on a reduced scale of the pilot block and a seal plate together with an assembling tool associated therewith;

Fig. 3 is a fragmentary enlarged sectional view through the lower end of the assembling tool;

Fig. 4 is a fragmentary sectional view illustrating a ball bearing and the assembling tool in place thereon, one seal plate having just been moved into position;

Fig. 5 is a fragmentary view similar to the lower position of Fig. 2 but illustrating a modified form of pilot block.

In the drawings the antifriction bearing, in this case a ball bearing, consists of an outer ring 5, an inner ring 6 with interposed antifriction bearing members 7. The seals, in this case flat annular disk seals 8, are formed of springy material such as light spring steel or other springy metal, springy plastics or the like. The bearing ring, in this case the outer ring, for carrying the seal is provided with an annular undercut groove 9 in one or both sides of the ring and there may be an anvil or abutment surface 10 against which a part of the seal may abut. The entrance to the groove defined by the annular lip 11 is of course of smaller diameter than the bottom of the groove so that the groove is described as being undercut.

The seal plate 8 of spring material when in place is of greater outside diameter than the entrance to the undercut groove so that the seal is held in place beneath the annular lip 11 and is so held by the inherent resiliency of the seal itself. The seal when in place may be in a plane or may be slightly conical as shown in Fig. 4. If desired the inner ring is rabbeted as at 12 and the inner edge of the seal washer may lie in close proximity to the cylindrical surface of the rabbet.

The preferred method of applying the seal to the bearing ring will now be described.

The seal plate 8, preferably in the form of a flat disk washer, is piloted concentrically and then sprung into generally conical form and while so sprung with its outer diameter contrasted it is forced past the entrance to the undercut groove and allowed to spring into place. In the form illustrated we employ a pilot block 13 having a pilot 14 snugly fitting the hole in the washer 8. The block beneath the pilot is preferably conical as indicated at 15 so as to limit the extent to which the seal washer 8 will be deformed. When a washer 8 is on the pilot block as indicated in Fig. 1 an assembling tool is applied so as to cone the washer and hold it with its outside diameter contracted. Such an assembling tool may consist of an annular member in the form of a sleeve 16, the inner diameter of which is equal to the desired contracted outside diameter of the seal washer, and that diameter is about equal to the diameter of the entrance to the undercut groove 9. The sleeve may have therein a punch or ejector 17 which may have a bore to fit the pilot 14. The ejector 17 and sleeve 16 are slidable relatively to each other and the slidable movement may be limited as by a pin 18 and a slot 19 as will be understood. If desired a spring 20 may be employed for holding the ejector in retracted position.

When the assembling tool is applied to the pilot block the ejector 17 pilots on the piloting portion 14 of the block and the surface 21 beneath the bottom of the cylindrical bore in the sleeve 16 will engage the seal washer 8. Downward pressure on the sleeve 16 will spring the seal washer 8 into conical form to contract its outer diameter and the coned washer will then slide into and be held within the sleeve 16 as indicated in Fig. 2. The assembling tool with the contracted coned washer in place is then applied to the bearing in concentric position and pilot means for piloting the tool and the bearing have been provided. In the form shown the sleeve 16 is provided with a counterbore 22 to fit the outer surface of the bearing ring and the bottom 23 of the counterbore may rest upon the edge of the bearing ring as shown in Fig. 4. When the assembling tool is in place as shown in Fig. 4 the punch or ejector 17 is forced downwardly so as to force the coned seal 8 out of the sleeve and past the overhanging lip 11 of the undercut groove. When the disk washer is released from the sleeve 16 it tends to flatten out and expand in diameter so that the outer edge expands into the undercut groove and holds the seal by the inherent resiliency of the material of the seal. If the undercut groove 9 is of sufficient depth the seal plate may flatten out into a plane but if the groove 9 is not of sufficient depth the outer edge of the seal washer will be confined and the extent of flattening out will be limited say to the extent shown in Fig. 4.

The single seal plate 8 has been shown on the pilot block 13 and in the assembling tool. However, several plates could be put in the assembling tool and the plates forced out into bearings one at a time or two or three at a time if a laminated type of seal is desired.

While the form of pilot shown in Fig. 1 gives full support to the seal disk and is in some respects highly advantageous, other forms of pilot blocks may be employed. As shown in Fig. 5 the pilot block 13' may carry a pilot portion 14' and the seal 8 may be piloted on the pilot portion 14' as heretofore indicated. The seal surface may rest on an annular fulcrum 25 so that when the assembling tool is applied the seal washer is coned by reason of the downward pressure of the sleeve on the outer edge of the seal plate and the upward pressure of the intermediate annular fulcrum 25.

Our method of applying spring seals to a bearing is simple and various materials including spring plastics may be applied without injury to the seals. While the seals have been shown as being coned outwardly in the bearing it will be clear that the coning may be reversed and the seal coned inwardly in which case the rabbet would have to be deeper to give sufficient room for the inwardly coned seal.

While the invention has been described in considerable detail and preferred forms of apparatus illustrated, it is to be understood that various changes may be made within the scope of the invention as defined in the appended claim.

We claim:

The method of applying a substantially flat springy annular disk-plate seal to a radial groove in an outer bearing ring, there being a radially inwardly directed retaining lip axially outwardly of the groove, which comprises, springing the disk plate into generally conical form so as to decrease the outer diameter of the disk sufficiently to clear the retaining lip; circumferentially continuously confining the outer edge of the disk at such reduced diameter; then, while continuing to confine said edge, introducing said outer edge as the leading edge past the retaining lip; and, finally, releasing said leading edge from confinement so as to permit it to spring into the groove as the disk flattens out from its conical form.

HARRY R. REYNOLDS.
CLARENCE G. BIDWELL.

REFERENCES CITED

The following references are of record in the file of this patent:

UNITED STATES PATENTS

| Number | Name | Date |
| --- | --- | --- |
| 1,192,404 | Ewart | July 25, 1916 |
| 1,498,674 | Runge | June 24, 1924 |
| 1,517,574 | Morrison | Dec. 2, 1924 |
| 1,630,339 | Ganster | May 31, 1927 |
| 1,736,959 | Gibbons | Nov. 26, 1929 |
| 1,803,966 | Gibbons | May 5, 1931 |
| 2,000,276 | De Laval-Crow | May 7, 1935 |
| 2,263,815 | Northrup | Nov. 25, 1941 |
| 2,304,581 | Lyon | Dec. 8, 1942 |